(12) United States Patent
Yone

(10) Patent No.: US 7,022,045 B2
(45) Date of Patent: Apr. 4, 2006

(54) VEHICLE ACCELERATOR PEDAL DEVICE

(75) Inventor: Shinichi Yone, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 286 days.

(21) Appl. No.: 10/397,129

(22) Filed: Mar. 26, 2003

(65) Prior Publication Data

US 2003/0190996 A1    Oct. 9, 2003

(30) Foreign Application Priority Data

Apr. 3, 2002  (JP)  ............................. 2002-101860

(51) Int. Cl.
- *F16H 59/48* (2006.01)
- *B60K 31/00* (2006.01)
- *G06F 17/00* (2006.01)
- *G06F 19/00* (2006.01)
- *G06F 7/00* (2006.01)

(52) U.S. Cl. ........................ 477/120; 477/97; 180/170; 701/52

(58) Field of Classification Search .................. 477/97, 477/120, 904, 905; 180/170; 701/52, 53, 701/70, 93
See application file for complete search history.

(56) References Cited

U.S. PATENT DOCUMENTS

| | | | | |
|---|---|---|---|---|
| 5,007,516 A | * | 4/1991 | Miyazaki | ...................... 192/72 |
| 5,161,633 A | * | 11/1992 | Torrielli et al. | ............. 180/170 |
| 5,215,057 A | * | 6/1993 | Sato et al. | ................... 123/400 |
| 5,485,892 A | * | 1/1996 | Fujita | .......................... 180/167 |
| 6,446,500 B1 | * | 9/2002 | Marquardt et al. | ............ 73/132 |
| 6,463,377 B1 | * | 10/2002 | Minowa et al. | ............... 701/70 |
| 6,547,691 B1 | * | 4/2003 | Hino | ............................ 477/37 |
| 2003/0176960 A1 | * | 9/2003 | Yamamura | ................... 701/36 |

FOREIGN PATENT DOCUMENTS

| | | | |
|---|---|---|---|
| JP | 63110063 A | * | 5/1988 |
| JP | 2001-105926 | | 4/2001 |

* cited by examiner

*Primary Examiner*—Tisha Lewis
(74) *Attorney, Agent, or Firm*—Hamre, Schumann, Mueller & Larson, P.C.

(57) ABSTRACT

An accelerator pedal device includes a pedal reaction force providing device for providing a reaction force to an accelerator pedal according to an amount of depression of the accelerator pedal operated by a driver. The reaction force to be provided from the pedal reaction force providing device to the pedal is controlled based on the depression amount of the accelerator pedal. This reaction force control allows precise agreement between throttle opening timing and pedal reaction force timing to produce a predetermined pedal reaction force at a desired degree of throttle opening.

8 Claims, 10 Drawing Sheets

(PRESENT EMBODIMENT)

(COMPARATIVE EXAMPLE)

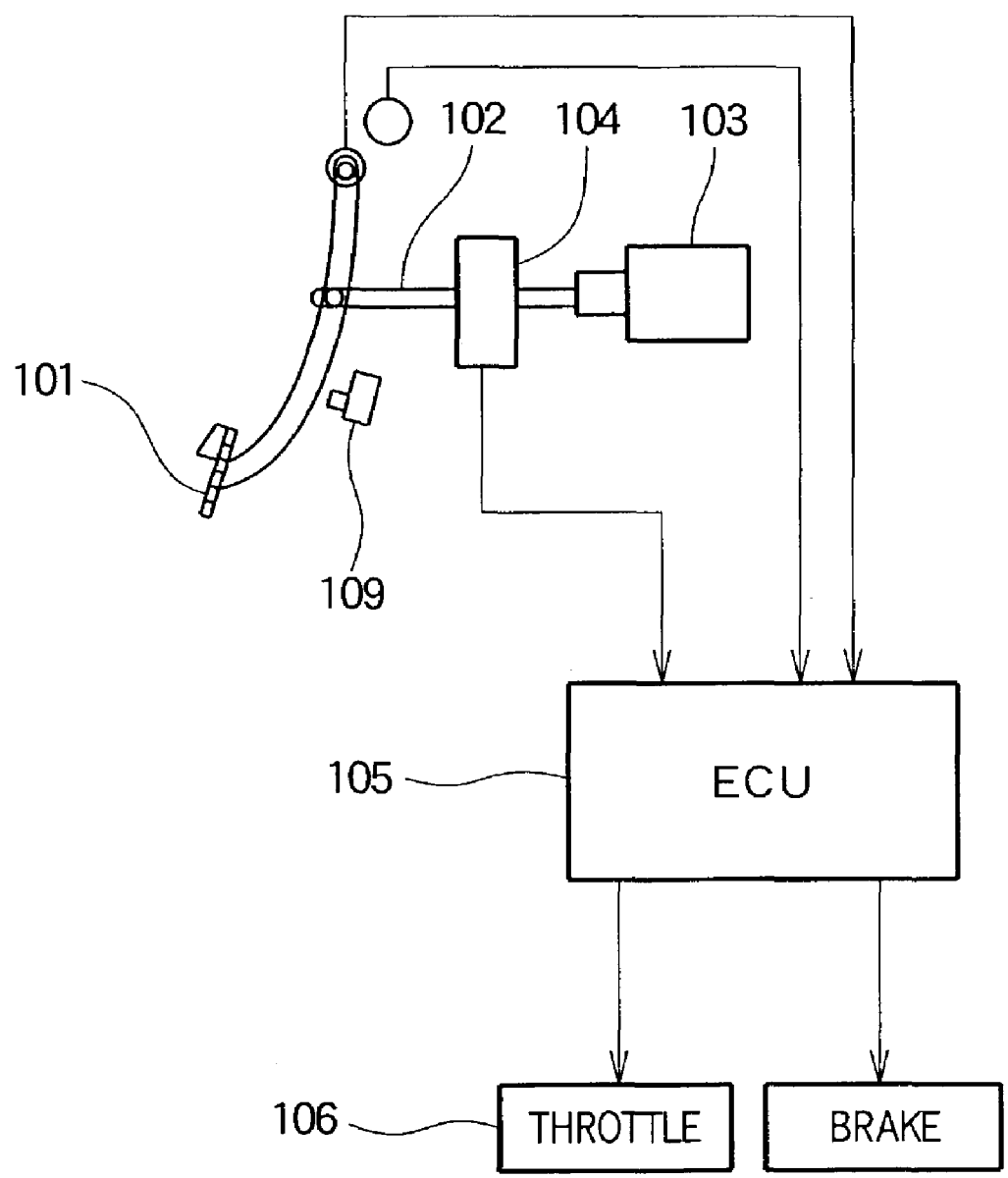

VEHICLE ACCELERATOR PEDAL DEVICE

FIELD OF THE INVENTION

The present invention relates to vehicle accelerator pedal devices which allow precise agreement between the timing of a desired degree of throttle opening and the timing of the production of a predetermined pedal reaction force, and allow precise agreement between kickdown and the production of reaction force at accelerator pedals.

BACKGROUND OF THE INVENTION

In vehicles, levers and pedals, for example, are input devices to be operated by drivers. When they are operated, certain amounts of reaction forces are generally received at hands and feet. There are, however, arts of positively producing the reaction forces in accordance with the operations of levers and pedals, that is, allowing the levers and pedals to serve as not only input devices but also output devices. Such devices are called haptic devices.

Such a device is disclosed, for example, in Japanese Patent Laid-Open Publication No. 2001-105926 entitled "Operating Device for Vehicle." This conventional vehicle operating device will be described with reference to FIG. 10.

The vehicle operating device shown in FIG. 10 has an accelerator pedal 101. The accelerator pedal 101 is connected to a stroke simulator 103 via a working shaft 102. A stroke sensor 104 is provided at the working shaft 102 so that the stroke simulator 103 produces a reaction force at the accelerator pedal 101 in accordance with the stroke of the accelerator pedal 101.

The stroke sensor 104 is connected via an ECU 105 to a throttle device 106. The ECU 105 supplies a command signal to the throttle device 106 to change the throttle opening in accordance with a pedal stroke.

In the above vehicle operating device, for causing a kickdown in a vehicle automatic transmission by rapidly deeply depressing the accelerator pedal 101 for rapid acceleration, it is possible to provide a kickdown switch 109 behind the accelerator pedal 101 as shown in the figure for providing a kickdown signal. When the accelerator pedal 101 is depressed to a predetermined position, the kickdown switch 109 is turned on, and a kickdown is effected in the automatic transmission under the on signal.

In the conventional art, while the throttle device 106 is electrically connected to the stroke sensor 104, it is not clear whether the stroke simulator 103 is electrically connected to the stroke sensor 104. Therefore in the adjustment of pedal reaction force to a predetermined value at a desired degree of throttle opening, a difference between the timing of the throttle opening and the timing of the pedal reaction force can occur, making delicate settings on the accelerator pedal operation and vehicle operability difficult.

Further, to produce a desired reaction force at the accelerator pedal 101 in a kickdown, for example, it is required to adjust the mounting position of the kickdown switch 109 to the vehicle body so that the kickdown switch 109 is turned on at a pedal stroke at which the reaction force is produced at the accelerator pedal 101. It is, however, difficult to precisely make such an adjustment of the mounting position of the kickdown switch 109 and also it is not easy to change the mounting position of the kickdown switch 109 to change a pedal stroke for effecting a kickdown.

It is thus desired to allow precise agreement of the timing of the production of a predetermined pedal reaction force with the timing of a desired degree of throttle opening, and also to allow precise and easy agreement between a kickdown and the production of an accelerator pedal reaction force (specifically, the production of a peak value), and further to allow easy change of the accelerator pedal position at which the kickdown and the production of the peak value are effected.

SUMMARY OF THE INVENTION

According to an aspect of the present invention, there is provided an accelerator pedal device for use in a vehicle, which comprises: a pedal depression amount detecting means for detecting an amount of depression of an accelerator pedal operated by a driver; a throttle controlling means for controlling the throttle opening based on a signal of the depression amount detected by the pedal depression amount detecting means; and a pedal reaction force providing means for providing the accelerator pedal with a reaction force in accordance with the depression amount of the accelerator pedal; wherein, the reaction force of the pedal reaction force providing means is controlled based on the signal of the depression amount detected by the pedal depression amount detecting means.

Thus, according to this invention, the throttle opening and the pedal reaction force are controlled based on the same signal of the depression amount detected by the pedal depression amount detecting means, so that the throttle opening timing and the pedal reaction force timing can be precisely matched to produce a predetermined pedal reaction force at a desired throttle opening.

In the present invention, the accelerator pedal device preferably further comprises a reaction force/transmission controlling means for, when the accelerator pedal is depressed by a predetermined amount, controlling the pedal reaction force providing means so that the reaction force has a peak value, and transmitting transmission information to an automatic transmission for controlling gear change. Specifically, based on the depression amount signal of the accelerator pedal provided by the pedal depression amount detecting means, a kickdown is effected and the pedal reaction force is produced at the accelerator pedal, so that the kickdown operation and the production of the peak value of the reaction force can be easily precisely matched at an accelerator pedal depression position which provides a desired throttle opening, and in addition, the kickdown position and the position for producing the peak value of the reaction force with respect to the throttle opening can be easily changed by the reaction force/transmission controlling means and the throttle controlling means without adding a special structure.

Further, in the present invention, the accelerator pedal device with a shift lever placed at a position of automatic transmission mode preferably controls, when the accelerator pedal is depressed by a predetermined amount, the pedal reaction force providing means so that the reaction force has a peak value and transmits transmission information to an automatic transmission, and, with the shift lever placed at a position of manual transmission mode, controls the pedal reaction force providing means so as not to produce a peak value of the reaction force. That is, the presence and absence of the peak value of the reaction force at the accelerator pedal in operation by automatic transmission and in operation by manual transmission can be easily switched.

Further, in the present invention, when the vehicle travels at a constant speed by means of a cruise control device, the accelerator pedal device preferably controls the pedal reaction force providing means to hold the accelerator pedal in a position corresponding to the throttle opening at that time. That is, when the accelerator pedal is further depressed from the position corresponding to. the throttle opening at that time, the vehicle can be quickly changed into an accelerated state.

Further, in the present invention, when the vehicle travels at a constant speed by means of a cruise control device, the accelerator pedal device preferably controls the pedal reaction force providing means to return the accelerator pedal to a stroke starting position and make the reaction force of the accelerator pedal small between the stroke starting position and a position corresponding to the throttle opening at the time of the constant-speed travel, and when the accelerator pedal is depressed to exceed the position corresponding to the throttle opening at the time of the constant-speed travel, to release the constant-speed travel and make the reaction force of the accelerator pedal great. That is, the reaction force of the accelerator pedal is made small between the stroke starting position and the position corresponding to the throttle opening at the time of the constant-speed travel, and the reaction force of the accelerator pedal is made great when the accelerator pedal is depressed to exceed the position corresponding to the throttle opening at the time of the constant-speed travel, so that a driver can be easily aware of the accelerator pedal position at which the acceleration of the vehicle starts, the accelerator position corresponding to the throttle opening at the time of the constant-speed travel, improving the operability of the vehicle.

Further, in the present invention, the accelerator pedal device preferably controls the pedal reaction force providing means to produce a peak value of the reaction force only when the accelerator pedal is depressed, and when the accelerator pedal is returned, not to produce a peak value of the reaction force. For example, as compared with the case where a switch for producing a peak value of reaction force is provided behind the accelerator pedal, and peak values are produced when the accelerator pedal is both depressed and returned, the present invention controls the pedal reaction force providing means to produce the peak value of the reaction force only when the accelerator pedal is depressed, allowing optimum settings on the accelerator pedal.

Further, in the present invention, the accelerator pedal device preferably mechanically produces part of the reaction force provided to the accelerator pedal with a return spring. That is, the return spring allows the reduction of reaction force produced at the pedal reaction force providing means, allowing a reduced capacity of the pedal reaction force providing means, and allowing a reduced cost and power consumption of the accelerator pedal device.

BRIEF DESCRIPTION OF THE DRAWINGS

Preferred embodiments of the present invention will be described in detail below, by way of example only, with reference to the accompanying drawings, in which:

FIG. 10 is a schematic diagram of a pedal device as a conventional vehicle operating device.

DETAILED DESCRIPTION OF THE PREFERRED EMBODIMENTS

Figure 1:
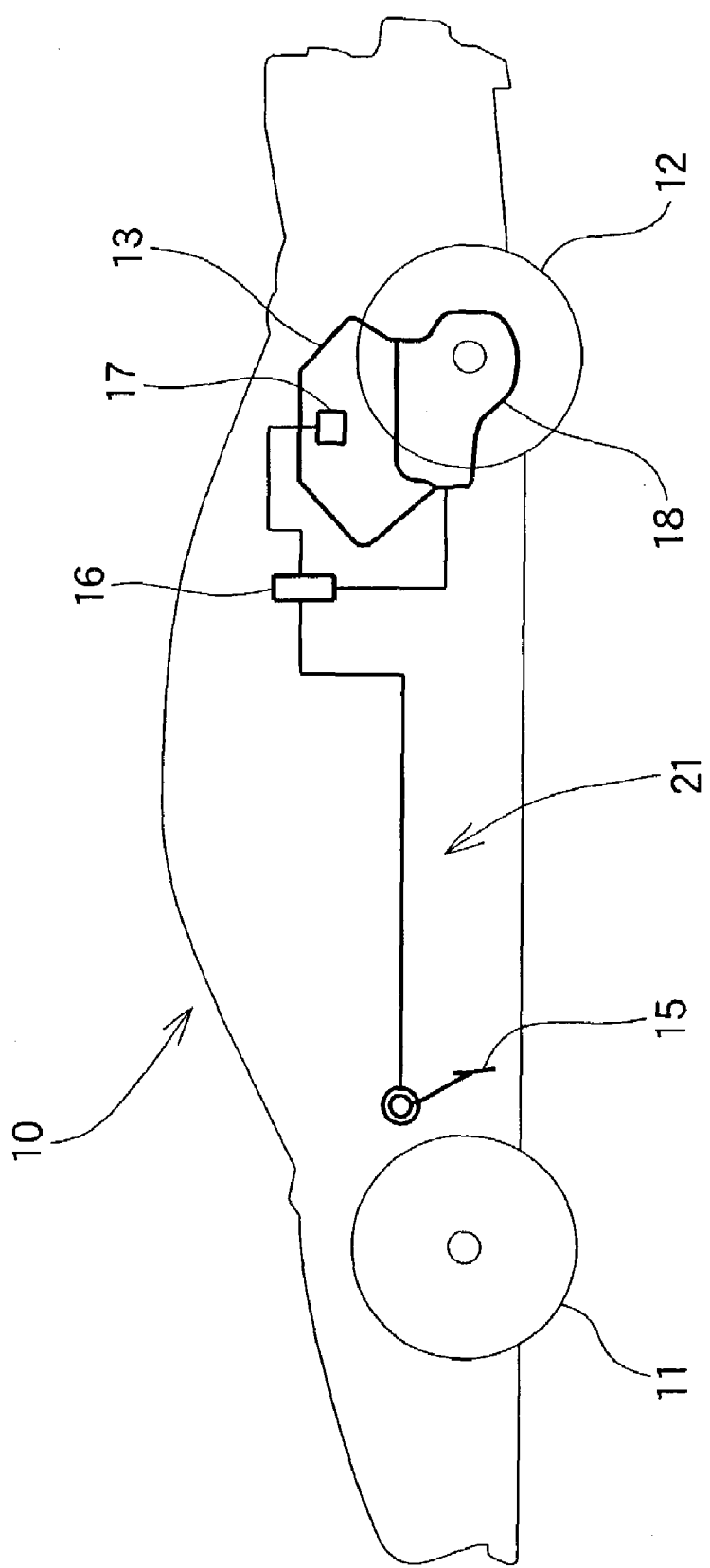
FIG. 1 is a schematic diagram of a vehicle in which an accelerator pedal device according to the present invention is used.

A vehicle 10 in the present embodiment shown in FIG. 1 is a midship vehicle with an engine 13 arranged closer to rear wheels 12 between front wheels 11 and the rear wheels 12. An accelerator pedal 15 is arranged in a front lower position of a driver seat. The accelerator pedal 15 is operated to change the degree of opening of a throttle valve (not shown) (that is, throttle opening) of a throttle body 17 provided at an upper portion of the engine 13, controlling the engine output. The operation of the accelerator pedal 15 also provides the control of the gear change of an automatic transmission 18 connected to the engine 13 under a command from an ECU 16.

An accelerator pedal is generally mechanically connected to a throttle valve via a throttle cable or the like. The vehicle 10 adopts a DBW (drive by wire) structure in which the accelerator pedal 15 is connected by wire or electrical wiring to the throttle body 17 (specifically, a throttle valve driving means (to be described in detail later) provided at the throttle body 17 for driving the throttle valve) via the ECU 16 and other components.

The adoption of this structure allows the quick opening and closing of the throttle valve in response to the operation of the accelerator pedal 15, further improving the response to the control of the engine output.

It also becomes possible to utilize an electrical signal from the accelerator pedal 15 for the gear change in the automatic transmission 18 as described above and other controls in addition to the driving of the throttle valve.

The accelerator pedal 15 and the ECU 16 constitute a part of the accelerator pedal device 21 of the present invention. The accelerator pedal device 21 will be described in detail with reference to the block diagram shown in FIG. 2.

Figure 2:
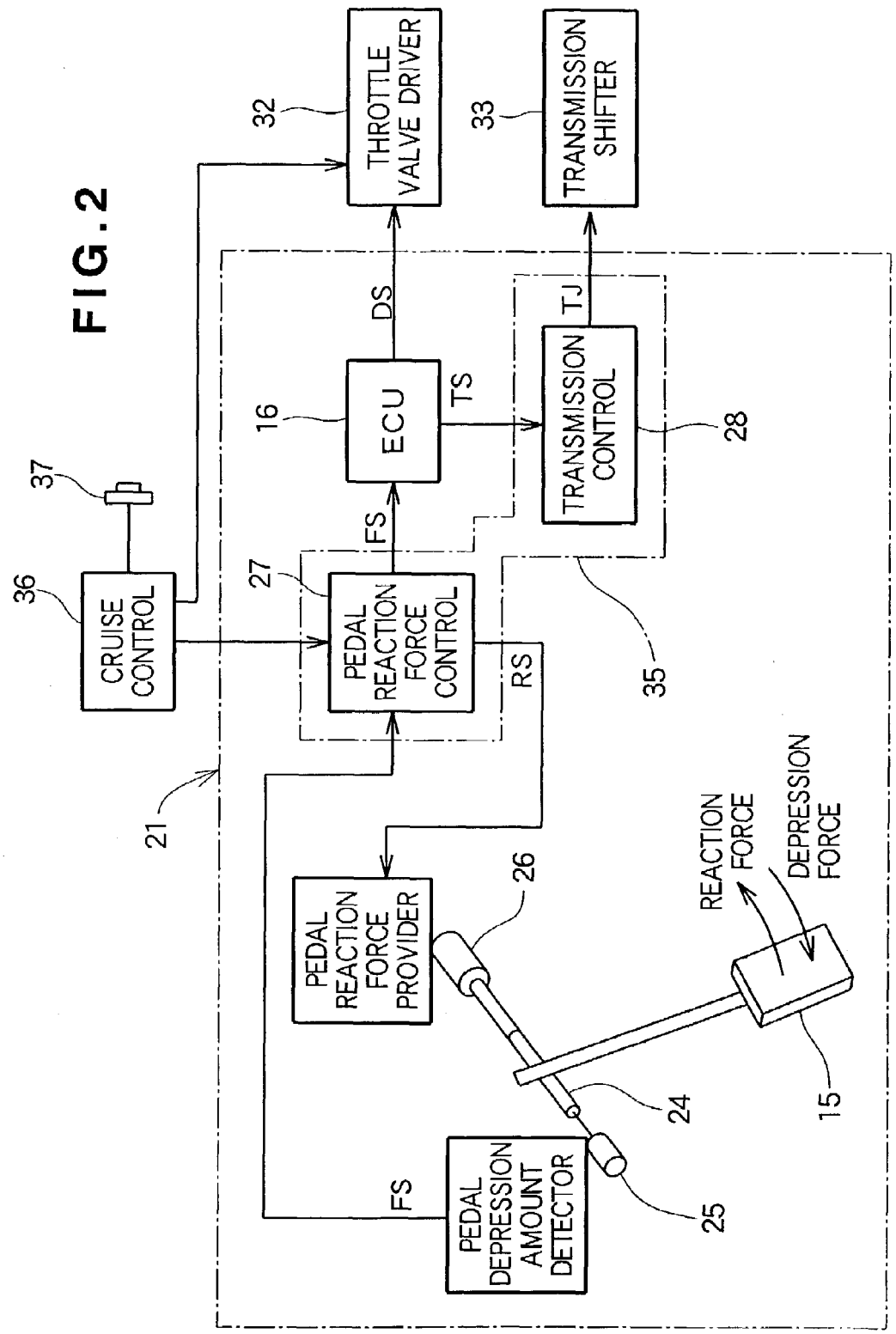
FIG. 2 is an electrical functional block diagram illustrating the configuration of the accelerator pedal device according to the present invention.

The accelerator pedal device 21 of the present invention shown in FIG. 2 has the accelerator pedal 15, a pedal depression amount detecting means 25, a pedal reaction force providing means 26, a pedal reaction force controlling means 27, the ECU 16, and a transmission controlling means 28.

The pedal depression amount detecting means 25 is provided at one end of a pedal shaft 24 as a pivot shaft of the accelerator pedal 15 for detecting the depression amount of the accelerator pedal 15.

The pedal reaction force providing means 26 is provided at the other end of the pedal shaft 24 for producing a reaction force (The reaction force here is a force in the opposite direction of the pedal force applied when the accelerator pedal 15 is depressed.) at the acceleration pedal 15 in accordance with a depression amount signal FS from the pedal depression amount detecting means 25.

The pedal reaction force controlling means 27 transmits a reaction force signal RS to the pedal reaction force providing means 26 based on the depression amount signal FS, to control the reaction force of the accelerator pedal 15.

The ECU 16 is a throttle controlling means which receives the depression amount signal FS transmitted from the pedal reaction force controlling means 27.

The transmission controlling means 28 receives a transmission command TS generated at the ECU 16 based on the depression amount signal FS received.

The ECU 16 outputs a drive signal DS to a throttle valve driving means 32 under the depression amount signal FS. The throttle valve driving means 32 opens and closes the throttle valve under the drive signal DS to change the throttle opening. The transmission controlling means 28 outputs transmission information TJ to a transmission shifting means 33 provided at the automatic transmission 18 shown in FIG. 1, under the transmission command TS outputted from the ECU 16, for transmission control. The transmission shifting means 33 shifts gears based on the transmission information TJ.

The pedal depression amount detecting means 25 is a rotation angle sensor for detecting the angle of rotation of the pedal shaft 24, for example, which detects the amount of depression of the accelerator pedal 15 as the angle of rotation of the accelerator pedal 15.

The pedal reaction force providing means 26 is, for example, an electric motor and the output shaft of the electric motor is connected to the pedal shaft 24.

The pedal reaction force controlling means 27 controls the depression position at which the pedal reaction force is produced and the reaction force value (especially a peak value), based on the depression amount signal FS.

The pedal reaction force controlling means 27 and the transmission controlling means 28 constitute a reaction force/transmission controlling means 35.

Figure 3:
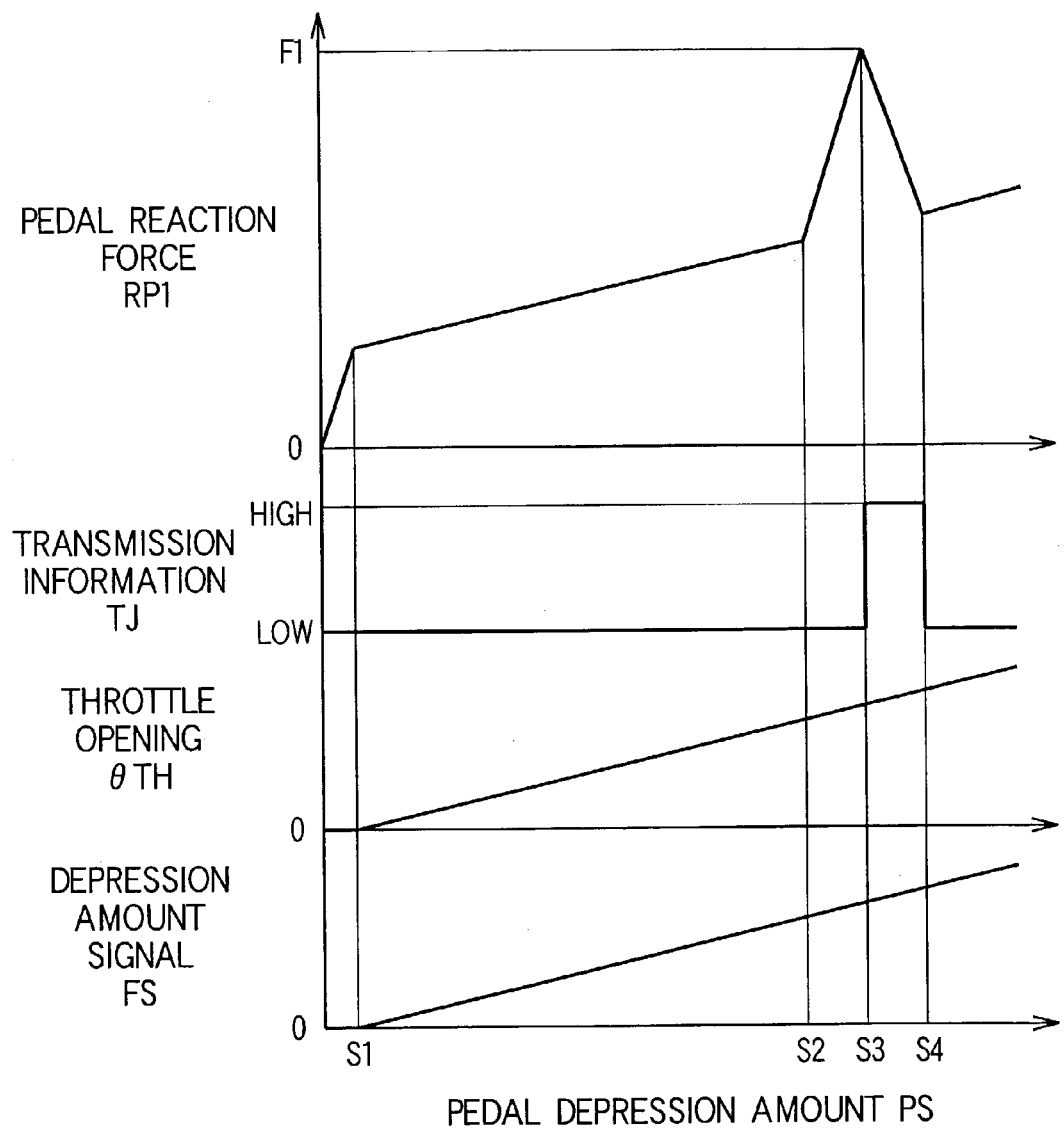
FIG. 3 is a graph illustrating the relationships of a depression amount signal, throttle opening, transmission information and pedal reaction force with respect to the pedal depression amount in the acceleration pedal device shown in FIG. 2.

The functions of the above-described accelerator pedal device 21 will be described with reference to the graph in FIG. 3. In the graph of FIG. 3, the vertical axis represents the depression amount signal FS from the pedal depression amount detecting means 25, the throttle opening θTH, the transmission information TJ from the transmission controlling means 28, and the pedal reaction force RP1 produced at the accelerator pedal 15 by the electric motor 26, while the horizontal axis represents the pedal depression amount PS of the accelerator pedal 15.

First, when a driver depresses the accelerator pedal 15 during driving, the depression amount signal FS starts increasing when the pedal depression amount PS reaches S1.

With the increase, the throttle opening θTH starts increasing when the pedal depression amount PS reaches S1. The throttle opening θTH is, for example, in a proportional relationship with the depression amount signal FS.

The pedal reaction force RP1 rapidly rises while the pedal depression amount PS increases from zero to S1, and then gradually increases with the increase of the pedal depression amount PS after the pedal depression amount PS exceeds S1. When the pedal depression amount PS reaches S2, the pedal reaction force RP1 starts rapid increase. When the pedal depression amount PS reaches S3, the transmission information TJ rises from LOW level to HIGH level, starting gear change, a kickdown here, and the pedal reaction force RP1 starts rapid decrease. The pedal reaction force RP1 reaches a peak value F1 when the pedal depression amount PS is S3. When the pedal depression amount PS reaches S4, the transmission information TJ turns from HIGH level to LOW level, and the pedal reaction force RP1 having decreased until that moment again starts gradual increase.

Figure 4A:
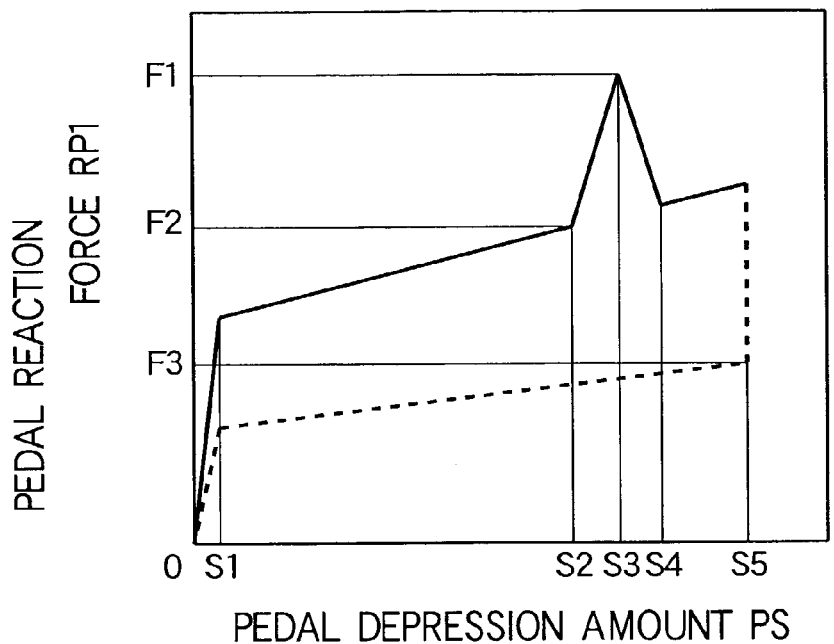
FIGS. 4A and 4B are graphs of the present embodiment and a comparative example, illustrating the relationships between the pedal depression amount and the pedal reaction force.
Figure 4B:
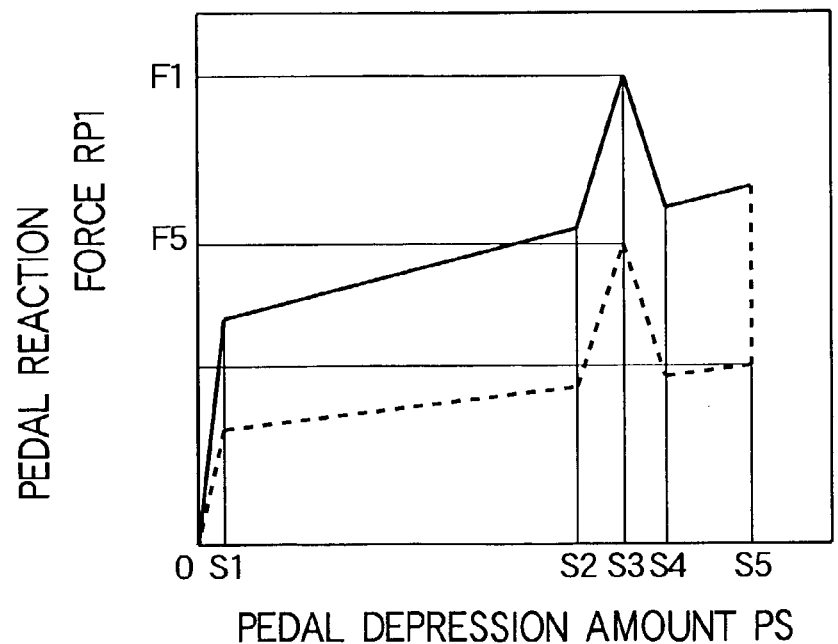

FIGS. 4A and 4B illustrate graphs for comparison in pedal reaction force between the present embodiment and the comparative example.

In the embodiment shown in FIG. 4A, when the pedal depression amount PS increases to S2, the pedal reaction force RP1 increases from F2 more rapidly than before. When the pedal depression amount PS reaches S3, the pedal reaction force RP1 reaches the peak value F1. Thereafter the pedal reaction force RP1 rapidly decreases, and then gradually increases after the pedal depression amount PS reaches S4. Solid lines in the graphs indicate the pedal reaction force when the pedal 15 is depressed.

When the accelerator pedal 15 with the pedal depression amount PS at S5 is returned, the pedal reaction force RP1 rapidly decreases to F3 and then gradually decreases. Broken lines in the graphs indicate the pedal reaction force when the pedal 15 is returned.

The comparative example shown in FIG. 4B illustrates an example of providing a special switch for producing pedal reaction force behind the accelerator pedal 15.

When the pedal 15 is depressed (solid lines), the switch is turned on, producing the peak value F1 of the pedal reaction force RP1 as in the embodiment of FIG. 4A. When the pedal 15 is returned (broken lines), the switch is also turned on, producing peak value F5 of the pedal reaction force RP1.

As shown in FIGS. 4A and 4B, in the present embodiment, the pedal reaction force controlling means 27 electrically controls the pedal reaction force providing means 26 to produce the pedal reaction force, allowing easy settings to produce a peak value of the pedal reaction force when the accelerator pedal 15 is depressed and not to produce a peak value of the pedal reaction force when the accelerator pedal 15 is returned, and allowing optimum settings as compared with the case of mechanically producing the pedal reaction force as in the comparative example.

Figure 5A:
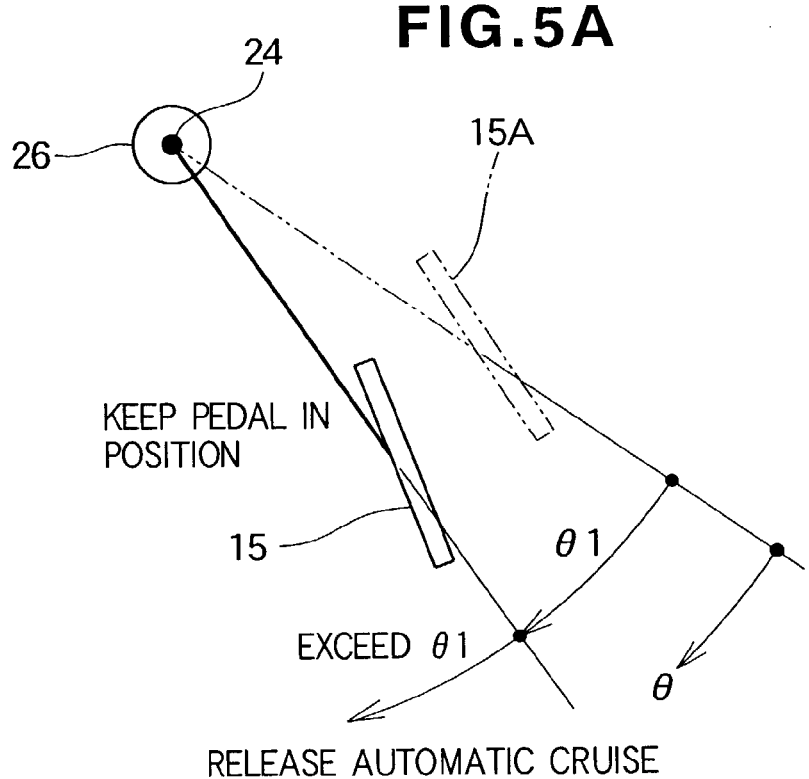
FIGS. 5A and 5B are diagrams illustrating the functions of the accelerator pedal when the vehicle is equipped with a cruise control device.
Figure 5B:
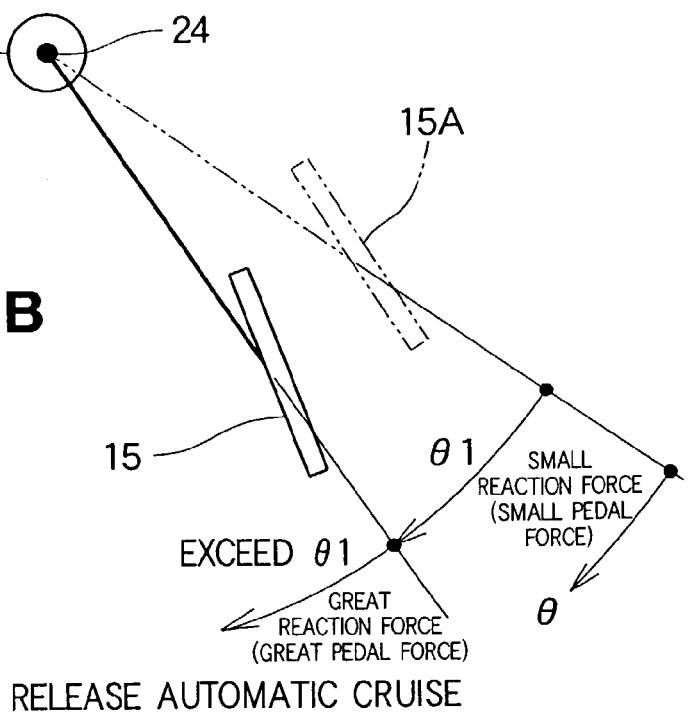

FIGS. 5A and 5B illustrate the functions of the accelerator pedal 15 when the vehicle 10 is equipped with a cruise control device 36 shown in FIG. 2 which allows automatically maintaining the vehicle speed constant without depressing the accelerator pedal 15. When a cruise control switch 37 shown in FIG. 2 is turned on during vehicle running, the cruise control device 36 controls the throttle valve driving means 32 shown in FIG. 2 to adjust the throttle opening, so as to maintain the vehicle speed at that time when the switch 37 is turned on.

In an embodiment shown in FIG. 5A, with the depression angle as the depression amount of the accelerator pedal 15 from the stroke starting position (position of the accelerator pedal 15 not depressed; a reference numeral of the accelerator pedal 15 at this position is 15A for convenience.) as θ, when the cruise control switch 37 is turned on with the accelerator pedal 15 depressed from the stroke starting position to θ1 of the depression angle θ during vehicle travel, the pedal reaction force controlling means 27 of the accelerator pedal device 21 shown in FIG. 2 controls the pedal reaction force providing means 26 to maintain the accelerator pedal 15 in the position of the depression angle θ1 even when a foot is taken off the accelerator pedal 15, and the vehicle 10 travels at a constant speed.

With this state, when the accelerator pedal 15 is depressed to cause the depression angle θ to exceed θ1, the vehicle 10 can be accelerated, and when a foot is taken off the accelerator pedal 15, the accelerator pedal 15 returns to the former position, that is, the position of the depression angle θ1, and the vehicle speed returns to the speed before the depression of the accelerator pedal 15, that is, the constant speed, and the vehicle again travels at the constant speed. When the brake pedal is depressed during the constant-speed travel, the constant-speed travel, that is, the automatic cruise is released, the accelerator pedal 15 is not maintained in the position, and the normal pedal operation is allowed.

In an embodiment shown in FIG. 5B, when the cruise control switch 37 shown in FIG. 2 is turned on with the accelerator pedal 15 depressed from the stroke starting position to θ1 of the depression angle θ during vehicle travel, the pedal reaction force controlling means 27 of the accelerator pedal device 21 shown in FIG. 2 controls the pedal reaction force providing means 26 to return the accelerator pedal 15 to the stroke starting position when a foot is taken off the accelerator pedal 15.

When the accelerator pedal 15 is depressed from the stroke starting position, the pedal reaction force controlling means 27 controls the pedal reaction force providing means 26 to make the reaction force of the accelerator pedal 15 small until the depression angle θ reaches θ1, and to make the reaction force of the accelerator pedal 15 greater than before when the depression angle θ exceeds θ1 and finally to produce the peak value. In other words, the pedal force of the driver can be made small until the depression angle θ reaches θ1, and the pedal force of the driver can be made great when the depression angle θ exceeds θ1.

Thus changing the pedal force at the depression angle θ1 allows the driver to be easily aware of the accelerator pedal position corresponding to the throttle opening at the time of automatic cruise, that is, the accelerator pedal position at the depression angle θ1 at which the vehicle 10 can be accelerated. In this case, when the brake pedal is depressed during a constant-speed travel, the automatic cruise is released as in the embodiment in FIG. 5A.

Figure 6A:
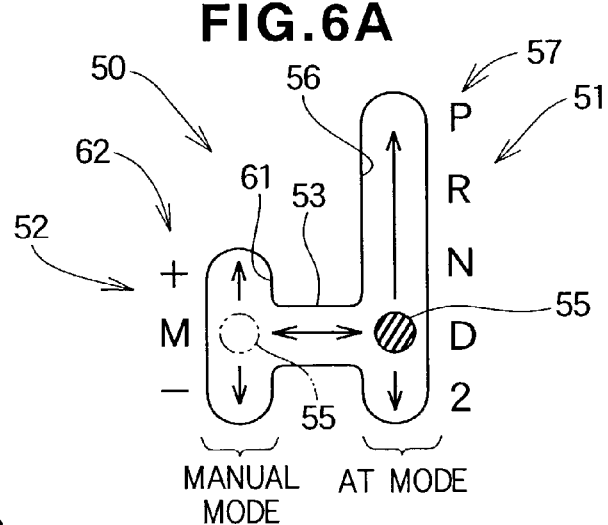
FIG. 6A illustrates a shift lever operating portion having an automatic transmission position and a manual transmission position.
Figure 6B:
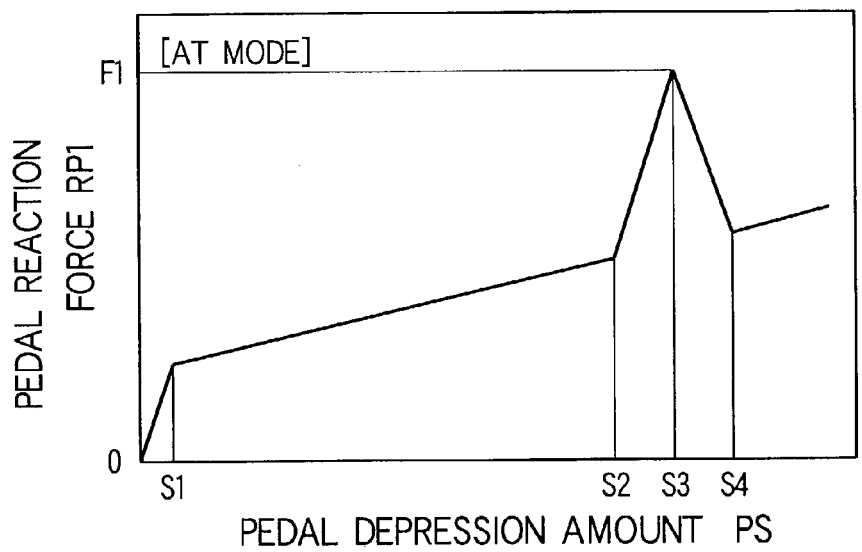
FIGS. 6B and 6C are graphs illustrating the relationships between the pedal depression amount and the pedal reaction force in AT mode and in manual mode.
Figure 6C:
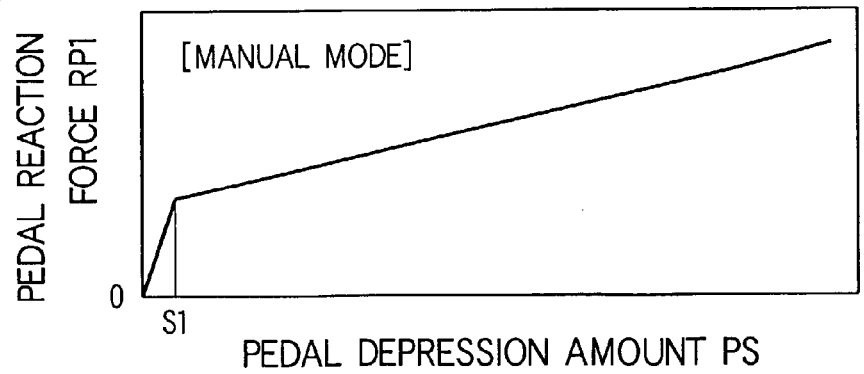

FIGS. 6A to 6C illustrate the relationships between the pedal reaction force of the accelerator pedal device 12 and the position of a shift lever, in which FIG. 6A is a schematic diagram illustrating a shift lever operating portion, and FIGS. 6B and 6C are graphs illustrating the relationships between the pedal reaction force and the pedal depression amount.

Referring to FIG. 6A, a shift lever operating portion 50 consists of an automatic transmission operating portion 51 provided with positions for automatic transmission, a manual transmission operating portion 52 provided with positions for manual transmission and a connecting portion 52 for their connection.

The automatic transmission operating portion 51 consists of a first slit 56 as a passage of a shift lever 55 and a first position indicator 57 indicating positions of the shift lever 55.

The first position indicator 57 has the marks of, for example, "P" indicating the parking position, "R" indicating the reverse position, "N" indicting the neutral position, "D" indicating the position of automatic shift of all gears, and "2" indicating the position of automatic shift of a first gear and a second gear. The shift lever 55 can be stopped at these positions.

The manual transmission operating portion 52 consists of a second slit 61 as a passage of the shift lever 55 and a second position indicator 62 indicating positions of the shift lever 55.

The second position indicator 62 has "+" indicating the position for shifting to a next higher gear, "−" indicating the position for shifting to a next lower gear and "M" indicating the neutral position. The shift lever 55 cannot be stopped at "+" or "−" when shifted there and is returned to "M."

The connecting portion 53 is a slit communicating with the first slit 56 and the second slit 61, allowing the shift lever 55 to be moved between the first slit 56 and the second slit 61.

When the shift lever 55 is positioned within the first slit 56, automatic transmission is possible. This state is hereinafter referred to as "AT mode."

When the shift lever 55 is positioned within the second slit 61, manual transmission is possible. This state is hereinafter referred to as "manual mode."

The AT mode and the manual mode can be effected with the automatic transmission 18 shown in FIG. 1.

In FIG. 6B, the vertical axis represents the pedal reaction force RP1 of the accelerator pedal 15 in the AT mode, and the horizontal axis represents the pedal depression amount PS of the accelerator pedal 15.

In the AT mode, the pedal reaction force controlling means 27 controls the pedal reaction force providing means 26 so as to produce the peak value F1 of the pedal reaction force RP1 when the pedal depression amount PS is S3.

In FIG. 6C, the vertical axis represents the pedal reaction force RP1 of the accelerator pedal 15 in the manual mode, and the horizontal axis represents the pedal depression amount PS of the accelerator pedal 15.

In the manual mode, the pedal reaction force controlling means 27 controls the pedal reaction force providing means 26 so as not to produce a peak value of the pedal reaction force RP1, and to produce the pedal reaction force RP1 in accordance with the pedal depression amount PS, the pedal reaction force RP1 in proportion to the pedal depression amount PS after the pedal depression amount PS exceeds S1, for example.

When a special switch for producing a peak value of pedal reaction force is provided behind an accelerator pedal, the peak value of the pedal reaction force is produced in AT mode, and also the peak value of the pedal reaction force is needlessly produced in manual mode.

In the accelerator pedal device 21 of the present invention, the pedal reaction force controlling means 27 can easily control the presence and absence of a peak value of pedal reaction force (that is, whether a peak value should be produced or not) in AT mode and manual mode.

As described with FIG. 2, the present invention is first characterized in that, in the vehicle accelerator pedal device 21 having the pedal depression amount detecting means 25 for detecting an amount of depression of the accelerator pedal 15 operated by a driver, the ECU 16 for controlling the throttle opening based on the signal FS of the depression amount detected with the pedal depression amount detecting means 25, and the pedal reaction force providing means 26 for providing reaction force to the accelerator pedal 15 in accordance with the depression amount of the accelerator pedal 15, the reaction force from the pedal reaction force providing means 26 is controlled under the signal FS of the depression amount detected by the pedal depression amount detecting means 25, that is, the pedal reaction force controlling means 27 controls the reaction force produced at the pedal reaction force providing means 26 based on the depression amount signal FS.

Since the throttle opening and the pedal reaction force are controlled based on the same signal FS of the depression amount detected with the pedal depression amount detecting means 25, the throttle opening timing and the pedal reaction force timing are precisely matched to produce a predetermined pedal reaction force at a desired throttle opening.

The present invention is secondly characterized, as described with FIGS. 2 and 3, in that, in the accelerator pedal device 21, the pedal reaction force providing means 26 is controlled to provide the peak value F1 of the pedal reaction force RP1 when the accelerator pedal 15 is depressed by a predetermined amount, and the automatic transmission 18 shown in FIG. 1, specifically, the reaction force/transmission controlling means 35 for transmitting the transmission information TJ to the transmission shifting means 33 is provided.

Since, based on the depression amount signal FS of the accelerator pedal 15 provided by the pedal depression amount detecting means 25, a kickdown is effected and the pedal reaction force RP1 is produced at the accelerator pedal 15, the kickdown and the production of the peak value F1 can be easily precisely matched at an accelerator pedal depression position which provides a desired throttle opening $\theta$TH, and in addition, the kickdown position and the position for producing the peak value F1 of the pedal reaction force RP1 with respect to the throttle opening $\theta$TH can be easily changed only by changing the program or the like stored in the reaction force/transmission controlling means 35 and the ECU 16 without adding a special structure.

As described above, since the throttle opening $\theta$TH, the transmission information TJ and the pedal reaction force RP1 are provided based on the single depression amount signal FS, the kickdown operation and the production of the peak value F1 of the pedal reaction force RP1 can be precisely matched, and the kickdown can be bodily sensed as a tactile feedback from the accelerator pedal 15 at the same time when the accelerator pedal 15 is depressed to accelerate the vehicle 10. The driver can thus be given a sense of unity with the vehicle 10 in driving operation.

The present invention is thirdly characterized, as shown in FIGS. 2, 3 and 6A to 6C, in that, in the accelerator pedal device 21, when the shift lever 55 is placed at a position of automatic transmission mode (that is, AT mode), the pedal reaction force providing means 26 is controlled so that the pedal reaction force RP1 has the peak value F1 when the accelerator pedal 15 is depressed by a predetermined amount, and also the transmission information TJ is transmitted to the automatic transmission 18 (specifically, the transmission shifting means 33), and when the shift lever 55 is placed at a position of manual transmission mode, the pedal reaction force controlling means 27 controls the pedal reaction force providing means 26 so as not to produce the peak value F1 of the pedal reaction force RP1.

The presence and absence of the peak value F1 of the pedal reaction force RP1 at the accelerator pedal 15 in operation by automatic transmission and in operation by manual transmission can be switched. For example, the present invention can avoid such a situation where a special switch is provided at the accelerator pedal 15 for the above switching and a peak value is produced both in operation by automatic transmission and in operation by manual transmission.

The present invention is fourthly characterized, as shown in FIGS. 2, 5A and 5B, in that, in the accelerator pedal device 21, when the vehicle 10 travels at a constant speed by means of the cruise control device 36, the pedal reaction force controlling means 27 controls the pedal reaction force providing means 26 so as to hold the accelerator pedal 15 in the position corresponding to the throttle opening at that time, that is, the position of $\theta$1 of the depression angle $\theta$.

When the accelerator pedal 15 is depressed further from the position corresponding to the throttle opening at that time, the vehicle can be quickly changed to an accelerated state.

The present invention is fifthly characterized in that, in the accelerator pedal device 21, the pedal reaction force providing means 26 is controlled to, when the vehicle 10 travels at a constant speed by the cruise control device 36, return the accelerator pedal 15 to the stroke starting position and make the reaction force of the accelerator pedal 15 small between the stroke starting position and the position corresponding to the throttle opening at the time of the constant-speed travel, and also to release the constant-speed travel and make the reaction force of the accelerator pedal 15 great when the accelerator pedal 15 is depressed further from the position corresponding to the throttle opening at the time of the constant-speed travel.

Making the reaction force of the accelerator pedal 15 small between the stroke starting position and the position corresponding to the throttle opening at the time of a constant-speed travel and making the reaction force of the accelerator pedal 15 great when the accelerator pedal 15 is depressed further from the position corresponding to the throttle opening at the time of the constant-speed travel allow a driver to be easily aware of the accelerator pedal position at which the acceleration of the vehicle 10 starts, that is, the accelerator position corresponding to the throttle opening at the time of the constant-speed travel, improving the operability of the vehicle 10.

The present invention is sixthly characterized, as shown in FIGS. 2, 4A and 4B, in that, in the accelerator pedal device 21, the pedal reaction force controlling means 27 controls the pedal reaction force providing means 26 so as to produce the peak value F1 of the pedal reaction force RP1 only when the accelerator pedal 15 is depressed and so as not to produce a peak value of the pedal reaction force RP1 when the accelerator pedal 15 is returned.

As compared with the case where a switch for producing a peak value of pedal reaction force is provided behind the accelerator pedal 15, and the peak values F1 and F5 are produced when the accelerator pedal 15 is both depressed and returned, respectively, as shown in the comparative example, the embodiment of the present invention controls the pedal reaction force providing means 26 to produce the peak value F1 of the pedal reaction force RP1 only when the accelerator pedal 15 is depressed, allowing optimum settings on the accelerator pedal 15.

Figure 7:
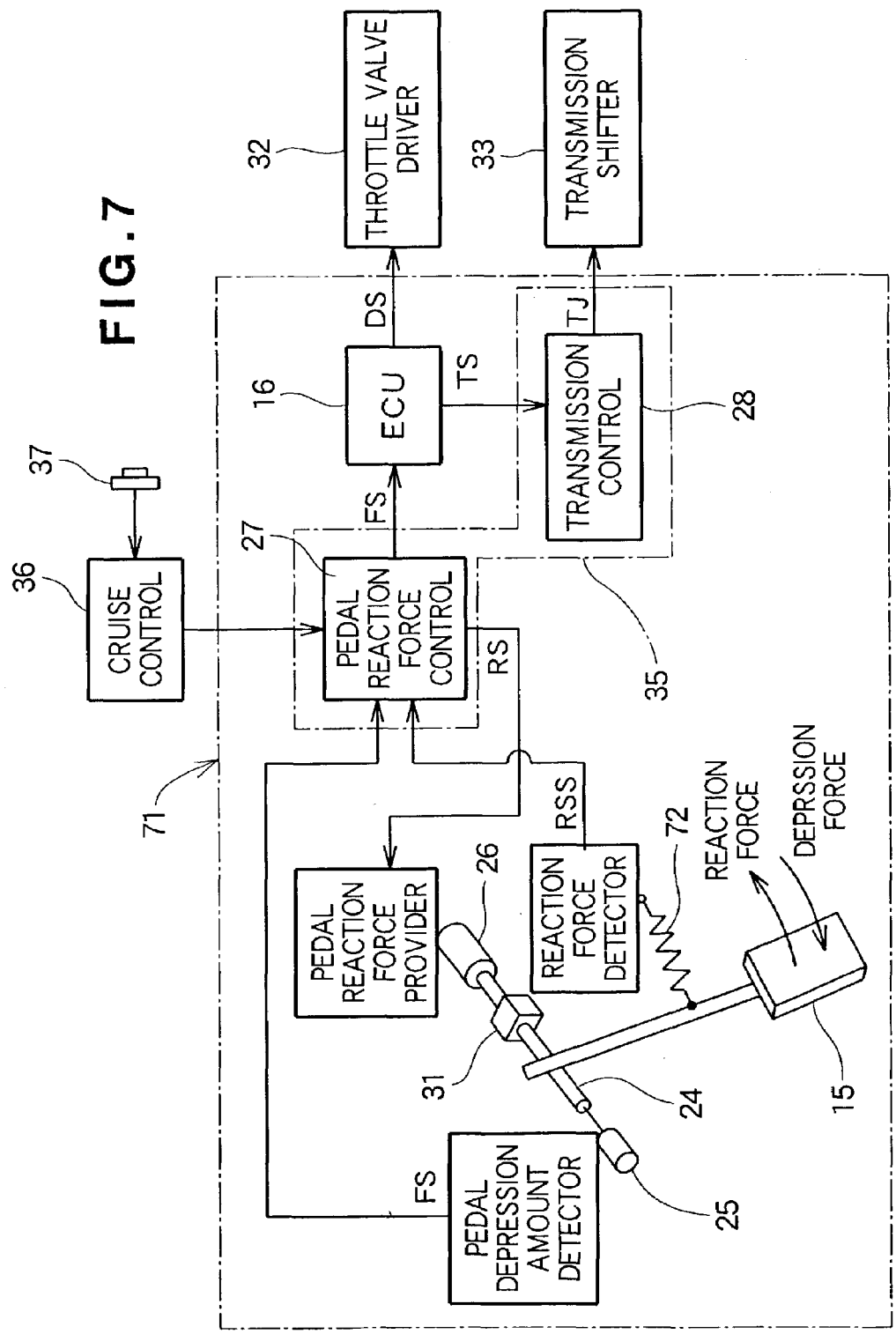
FIG. 7 is an electrical functional block diagram illustrating the configuration of an accelerator pedal device according to another embodiment of the present invention.

FIG. 7 is a block diagram illustrating another embodiment of an accelerator pedal device according to the present invention. Components identical to those in the embodiment shown in FIG. 2 are affixed identical reference numerals and will not be described in detail.

An accelerator pedal device 71 consists of an accelerator pedal 15, a tension coil spring 72 for providing the accelerator pedal 15 with a given reaction force in a direction opposite to the direction of pedal force applied to the accelerator pedal 15 depressed, a pedal depression amount detecting means 25, a pedal reaction force providing means 26, a pedal reaction force controlling means 27, an ECU 16, a transmission controlling means 28, and a reaction force detecting means 31 interposed on a pedal shaft 24 for detecting the reaction force produced by the pedal reaction force providing means 26 and transmitting a reaction force detection signal RSS to the pedal reaction force controlling means 27.

The pedal reaction force controlling means 27 controls the depression position at which pedal reaction force is produced under a depression amount signal FS, and controls the reaction force value (especially the peak value) based on the reaction force detection signal RSS.

Figure 8:
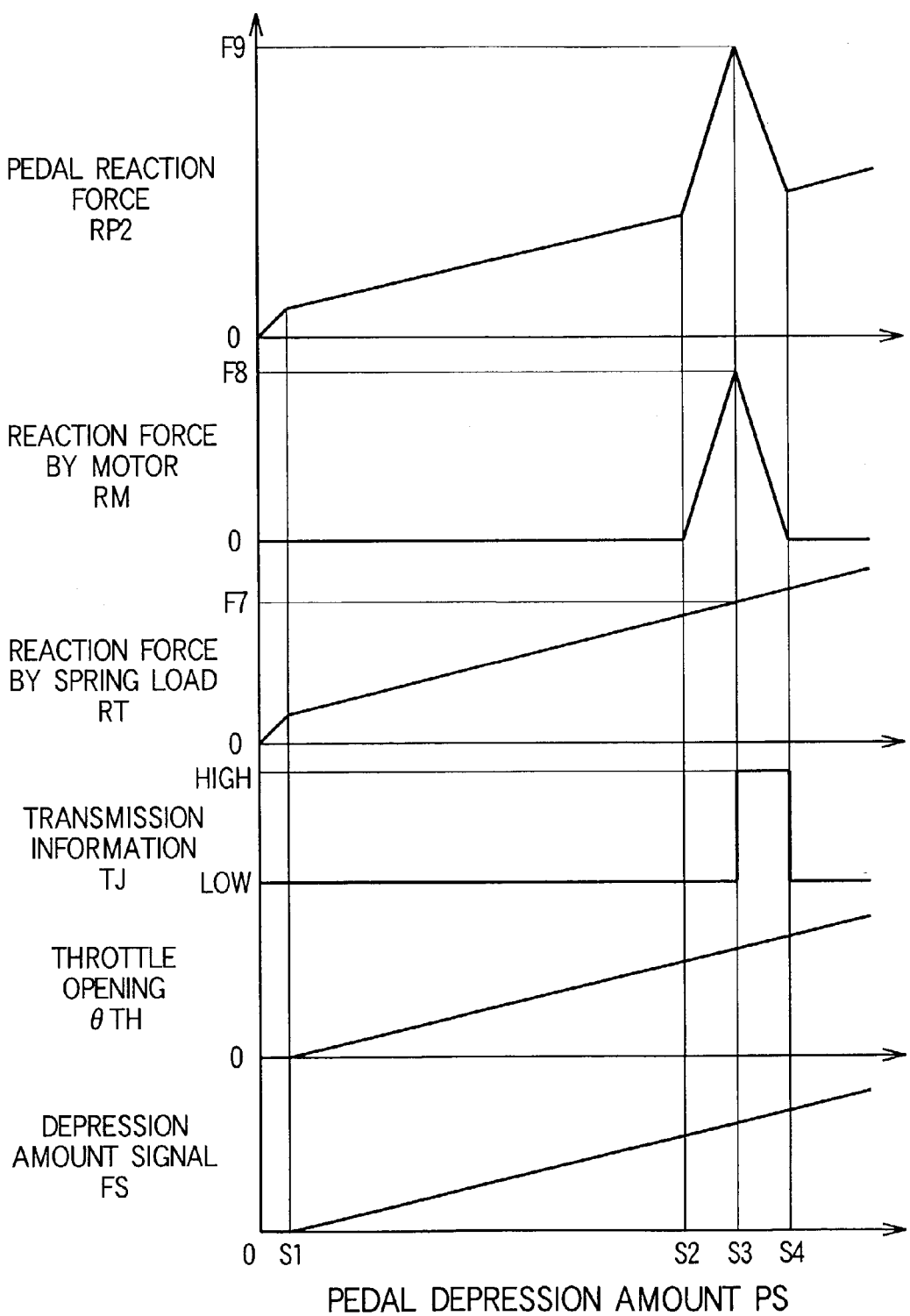
FIG. 8 is a graph illustrating the relationships of a depression amount signal, throttle opening, transmission information, reaction force by a spring load, reaction force produced by a motor and pedal reaction force with respect to the pedal depression amount in the accelerator pedal device shown in FIG. 7.

FIG. 8 illustrates a graph relating to pedal depression in the accelerator pedal device 71 according to the other embodiment shown in FIG. 7. The vertical axis represents a depression amount signal FS, throttle opening θTH, transmission information TJ, reaction force RT by the spring load of the tension coil spring 72, reaction force RM produced by an electric motor as the pedal reaction force providing means 26, and pedal reaction force RP2 as the sum of the reaction force RT and the reaction force RM, and the horizontal axis represents the pedal depression amount PS.

First, when a driver depresses the accelerator pedal 15 during driving, the depression amount signal FS starts increasing when the pedal depression amount PS reaches S1. With this, the throttle opening θTH starts increasing when the pedal depression amount PS reaches S1.

The reaction force RM by the electric motor 26 is not produced until the pedal depression amount PS reaches S2, and starts rapid increase when the pedal depression amount PS reaches S2. When the pedal depression amount PS reaches S3, the transmission information TJ rises from LOW level to HIGH level to start a gear change, a kickdown here, and the reaction force RM by the electric motor 26 which has increased until that moment starts rapid decrease. The reaction force RM by the electric motor 26 reaches peak value F8 when the pedal depression amount PS reaches S3.

When the pedal depression amount PS reaches S4, the electric motor 26 is stopped and the reaction force RM becomes zero, and the transmission information TJ turns from HIGH level to LOW level.

The reaction force RT by the spring load of the tension coil spring 72 rapidly increases until the pedal depression amount PS reaches S1, and after the pedal depression amount PS exceeds S1, increases substantially proportionately with the pedal depression amount PS. The reaction force RT reaches F7 when the pedal depression amount PS reaches S3.

The reaction force RM by the electric motor 26 is added to the reaction force RT by the spring load to provide the pedal reaction force RP2. For example, the addition of the reaction force RT (=F7) to the reaction force RM (=F8) when the pedal depression amount PS is S3 provides peak value F9 of the pedal reaction force RP2.

The structure of producing the pedal reaction force RP2 with the tension coil spring 72 and the electric motor 26 allows the electric motor 26 to be operated only when the pedal depression amount PS is between S2 and S4, reducing power consumed by the vehicle. As compared with the case where pedal reaction force is produced only by an electric motor, the present embodiment can have an electric motor of a smaller output, reducing the cost of the electric motor.

Figure 9:
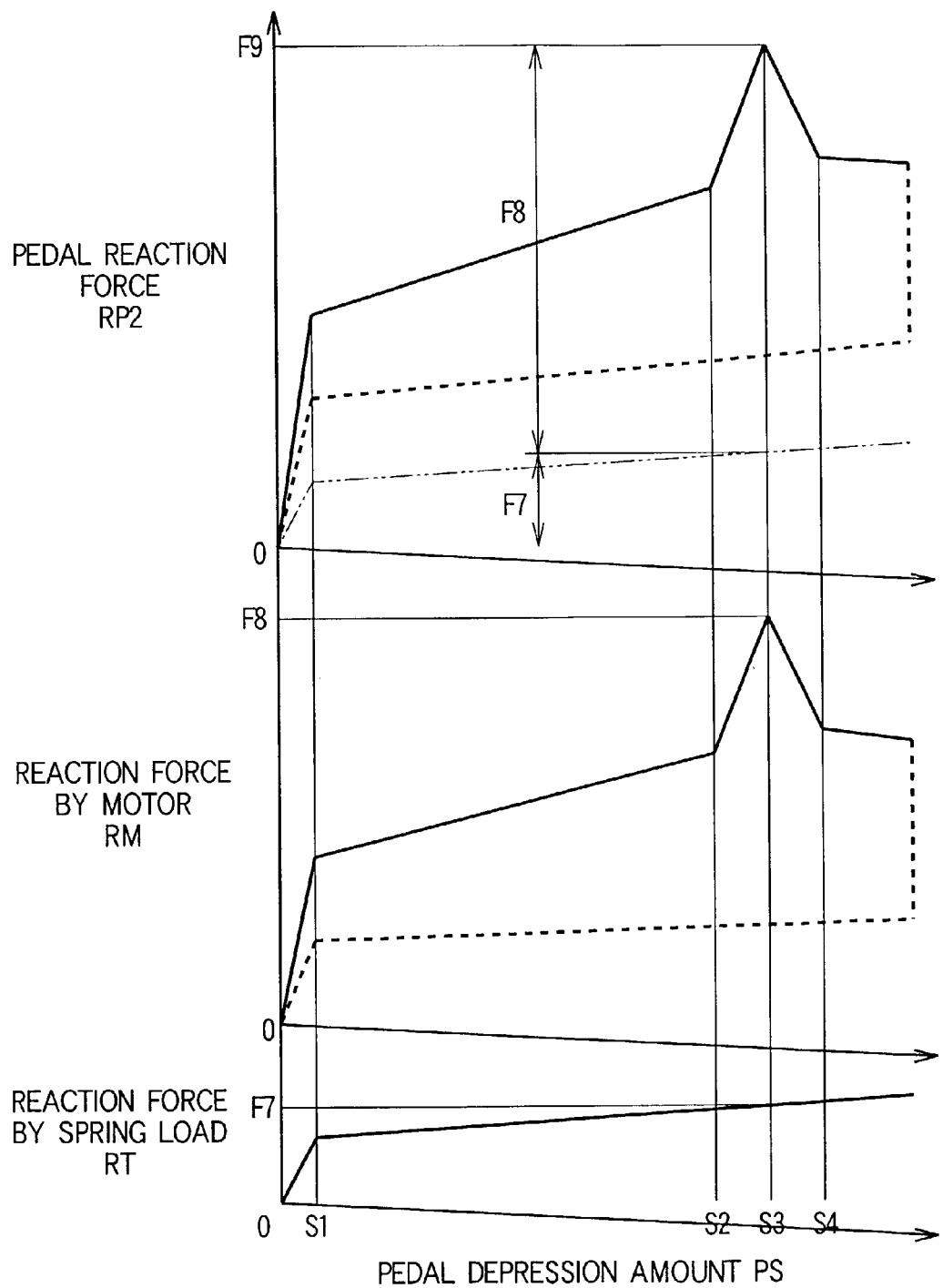
FIG. 9 is a graph illustrating the relationships of the reaction force by the spring load, the reaction force produced by the motor and the pedal reaction force with respect to the pedal depression amount included in the graph shown in FIG. 8.

FIG. 9 illustrates the reaction force RM produced by the motor 26 and the reaction force RP2 in FIG. 8 at the time when the acceleration pedal 15 is depressed and also illustrates those at the time when the accelerator pedal 15 is returned. Solid lines indicate the reaction force during depression and broken lines indicate the reaction force during return. The reaction force RT by the spring load is indicated only by solid lines because its reaction force at the time when the accelerator pedal 15 is returned is substantially equal to its reaction force during depression.

When the pedal depression amount PS is S3, the reaction force RT of pedal reaction force by the spring load is F7 and the reaction force RM produced by the electric motor 26 is F8, so that the pedal reaction force RP2 at that time is F9, the sum of the reaction force F7 and the reaction force F8. That is, this embodiment combines the reaction forces of the electric motor 26 and the tension coil spring 72 to provide the reaction force RP2 of the accelerator pedal 15, requiring less capacity of the electric motor 26, and allowing the use of a smaller electric motor.

The above-described electric motor 26 is not limited to a rotary one, and may be a linear motor or an actuator as another power source such as the combination of a hydraulic cylinder and a hydraulic generator or the combination of a pneumatic cylinder and a pneumatic generator. The linear motor, hydraulic generator or pneumatic generator is electrically controlled to control the pedal reaction force.

The relationships between the pedal depression amount PS and the pedal reaction forces RP1 and RP2 described with FIGS. 3 and 8 are contents previously stored in the pedal reaction force controlling means 27 and the ECU 16, and depend on the engine rpm, the engine torque, the vehicle speed, the gear position of the automatic transmission 18 before kickdown, and the like.

As described with FIG. 7, the present invention is seventhly characterized in that the accelerator pedal device 71 mechanically produces part of reaction force to be provided to the accelerator pedal 15 with the tension coil spring 72.

The tension coil spring 72 allows the reduction of reaction force produced at the pedal reaction force providing means 26, allowing a reduced capacity of the pedal reaction force providing means 26, and allowing a reduced cost and power consumption of the accelerator pedal device 72.

Although the reaction force/transmission controlling means 35 are configured separately from the ECU 16 in the embodiments of the present invention, the reaction force/transmission controlling means 35 may be provided within the ECU 16.

While the reaction force detecting means 31 is provided in the accelerator pedal device 71 in the embodiment shown in FIG. 7, the reaction force detecting means 31 may be provided in the accelerator pedal device 21 in the embodiment shown in FIG. 2.

The present disclosure relates to the subject matter of Japanese Patent Application No. 2002-101860, filed Apr. 3, 2002, the disclosure of which is incorporated herein by reference in its entirety.

What is claimed is:

1. An accelerator pedal device for use in a vehicle, comprising:

a pedal depression amount detecting means for detecting an amount of depression of an accelerator pedal operated by a driver;

a throttle controlling means for controlling the throttle opening based on a signal of said depression amount detected by said pedal depression amount detecting means; and a pedal reaction force providing means for providing said accelerator pedal with a reaction force in accordance with said depression amount of said accelerator pedal; wherein, said reaction force of said pedal reaction force providing means is controlled based on said signal of said depression amount detected by said pedal depression amount detecting means; and further comprising a reaction force/transmission controlling means for controlling said pedal reaction force providing means and an automatic transmission of the vehicle, wherein when said accelerator pedal is depressed by a predetermined threshold amount within a measured full range of motion from an undepressed position to a fully depressed position, as measured by said pedal depression amount detecting means, the reaction force/transmission controlling means provide a reaction force signal to said pedal reaction force providing means so that said reaction force has a peak value, and at the same time, the reaction force/transmission controlling means transmits transmission information to the automatic transmission for controlling gear change of the automatic transmission.

2. An accelerator pedal device as set forth in claim 1, wherein when said accelerator pedal is depressed by a predetermined amount with a shift lever placed at a position of automatic transmission mode, said pedal reaction force providing means is controlled so that said reaction force has a peak value and transmission information is transmitted to an automatic transmission, and, with said shift lever placed at a position of manual transmission mode, said pedal reaction force providing means is controlled so as not to produce a peak value of said reaction force.

3. An accelerator pedal device as set forth in claim 1, wherein when said vehicle travels at a constant speed by means of a cruise control device, said pedal reaction force providing means is controlled to hold said accelerator pedal in a position corresponding to a throttle opening at that time.

4. An accelerator pedal device as set forth in claim 1, wherein when said vehicle travels at a constant speed by means of a cruise control device, said pedal reaction force providing means is controlled to return said accelerator pedal to a stroke starting position and make said reaction force of said accelerator pedal small between said stroke starting position and a position corresponding to the throttle opening at the time of the constant-speed travel, and when said accelerator pedal is depressed to exceed said position corresponding to the throttle opening at the time of the constant-speed travel, to release said constant-speed travel and make said reaction force of said accelerator pedal great.

5. An accelerator pedal device as set forth in claim 1, wherein said pedal reaction force providing means is controlled to produce a peak value of said reaction force only when said accelerator pedal is depressed, and when said accelerator pedal is returned, not to produce a peak value of said reaction force.

6. An accelerator pedal device as set forth in claim 1, wherein said reaction force provided to said accelerator pedal is partly mechanically produced by a return spring.

7. An accelerator pedal device for use in a vehicle, comprising:

a pedal depression amount detecting means for detecting an amount of depression of an accelerator pedal operated by a driver;

a throttle controlling means for controlling the throttle opening based on a signal of said depression amount detected by said pedal depression amount detecting means; and a pedal reaction force providing means for providing said accelerator pedal with a reaction force in accordance with said depression amount of said accelerator pedal, said reaction force of said pedal reaction force providing means is controlled based on said signal of said depression amount detected by said pedal depression amount detecting means;

wherein when said accelerator pedal is depressed by a predetermined amount with a shift lever placed at a position of automatic transmission mode, said pedal reaction force providing means is controlled so that said reaction force has a peak value and transmission information is transmitted to an automatic transmission, and, with said shift lever placed at a position of manual transmission mode, said pedal reaction force providing means is controlled so as not to produce a peak value of said reaction force.

8. An accelerator pedal device for use in a vehicle, comprising:

a pedal depression amount detecting means for detecting an amount of depression of an accelerator pedal operated by a driver;

a throttle controlling means for controlling jog the throttle opening based on a signal of said depression amount detected by said pedal depression amount detecting means; and a pedal reaction force providing means for providing said accelerator pedal with a reaction force in accordance with said depression amount of said accelerator pedal, said reaction force of said pedal reaction force providing means is controlled based on said signal of said depression amount detected by said pedal depression amount detecting means;

wherein when said vehicle travels at a constant speed by means of a cruise control device, said pedal reaction force providing means is controlled to return said accelerator pedal to a stroke starting position and make said reaction force of said accelerator pedal small between said stroke starting position and a position corresponding to the throttle opening at the time of the constant-speed travel, and when said accelerator pedal is depressed to exceed said position corresponding to the throttle opening at the time of the constant-speed travel, to release said constant-speed travel and make said reaction force of said accelerator pedal great.

* * * * *